United States Patent
Tran et al.

(10) Patent No.: US 8,752,789 B2
(45) Date of Patent: Jun. 17, 2014

(54) HORIZONTAL TAIL LOAD ALLEVIATION SYSTEM

(71) Applicant: The Boeing Company, Chicago, IL (US)

(72) Inventors: Chuong B. Tran, Mukilteo, WA (US); Kioumars Najmabadi, Bellevue, WA (US); Edward E. Coleman, Lake Forest Park, WA (US); David W. Grubb, Monroe, WA (US)

(73) Assignee: The Boeing Company, Chicago, IL (US)

( * ) Notice: Subject to any disclaimer, the term of this patent is extended or adjusted under 35 U.S.C. 154(b) by 39 days.

(21) Appl. No.: 13/716,163

(22) Filed: Dec. 16, 2012

(65) Prior Publication Data

US 2014/0067168 A1 Mar. 6, 2014

Related U.S. Application Data

(62) Division of application No. 12/239,278, filed on Sep. 26, 2008, now Pat. No. 8,342,445.

(51) Int. Cl.
*B64C 9/00* (2006.01)

(52) U.S. Cl.
USPC .............. 244/87; 244/3.21; 244/89; 244/90 R

(58) Field of Classification Search
USPC ................. 244/87, 3.21, 89, 90 R, 91, 159.3; 114/332, 162, 144 RE
See application file for complete search history.

(56) References Cited

U.S. PATENT DOCUMENTS

| | | | |
|---|---|---|---|
| 4,455,004 A | 6/1984 | Whitaker, Sr. |
| 4,479,620 A | 10/1984 | Rogers et al. |
| 4,651,955 A | 3/1987 | Krafka |
| 4,725,020 A | 2/1988 | Whitener |
| 4,796,192 A | 1/1989 | Lewis |
| 4,821,981 A | 4/1989 | Gangsaas et al. |
| 5,082,207 A | 1/1992 | Tulinius |
| 5,135,186 A | 8/1992 | Ako |
| 5,186,416 A | 2/1993 | Fabre et al. |
| 5,375,793 A | 12/1994 | Rivron et al. |
| 5,375,794 A | 12/1994 | Bleeg |
| 5,681,014 A | 10/1997 | Palmer |
| 5,875,998 A | 3/1999 | Gleine et al. |
| 5,881,971 A | 3/1999 | Hickman |
| 5,921,506 A | 7/1999 | Appa |
| 5,936,369 A | 8/1999 | Iwashita et al. |
| 6,042,059 A | 3/2000 | Bilanin et al. |
| 6,161,801 A | 12/2000 | Kelm et al. |
| 6,641,086 B2 | 11/2003 | Clark |
| 6,729,579 B1 | 5/2004 | Becker |
| 6,766,981 B2 | 7/2004 | Volk |

(Continued)

OTHER PUBLICATIONS

Ford, "Continuing Wing Production," Aircraft Engineering and Aerospace Technology, vol. 70, No. 1, Jan. 1998, p. 9-14.

(Continued)

*Primary Examiner* — Christopher P Ellis
(74) *Attorney, Agent, or Firm* — Yee & Associates, P.C.

(57) ABSTRACT

A method for controlling control surfaces. A position limit is identified for movement of a control surface based on a load limit set for the control surface and a number of vehicle current operation parameters to form an identified position limit. Responsive to receiving a command to move the control surface on a vehicle to a new position, the control surface is commanded to move to a position within the identified position limit.

17 Claims, 6 Drawing Sheets

(56) References Cited

U.S. PATENT DOCUMENTS

| | | |
|---|---|---|
| 6,772,979 B2 | 8/2004 | Kubica et al. |
| 6,863,242 B2 | 3/2005 | Van De Kreeke et al. |
| 6,935,596 B2 | 8/2005 | Walter |
| 7,641,152 B2 | 1/2010 | Onu et al. |
| 7,854,467 B2 | 12/2010 | McKnight et al. |
| 8,024,079 B2 | 9/2011 | Najmabadi et al. |
| 2005/0242234 A1 | 11/2005 | Mahmulyin |
| 2007/0114327 A1 | 5/2007 | Dees et al. |

OTHER PUBLICATIONS

Krahe, "Airbus Fly-by-Wire Aircraft at a Glance," FAST, Airbus Technical Digest, No. 20, Dec. 1996, pp. 2-9, accessed May 20, 2008 http://www.airbus.com/support/publications/.

Raymond et al., "Aircraft Flight Control Actuation System Design," Society of Automotive Engines, Sep. 1993, pp. 102-106.

White, "Improving the Airplane Efficiency by Use of Wing Maneuver Load Alleviation," Journal of Aircraft, vol. 8, No. 10, Oct. 1971, pp. 769-775.

HORIZONTAL TAIL LOAD ALLEVIATION SYSTEM

This application is a divisional of application Ser. No. 12/239,278, filed Sep. 26, 2008.

BACKGROUND INFORMATION

1. Field

The present disclosure relates generally to aircraft and in particular, to control surfaces for aircraft. Still more particularly, the present disclosure relates to a computer implemented method, apparatus, and computer program code for manipulating control surfaces to reduce loads on an aircraft.

2. Background

Control surfaces are airfoils that deflect air in one direction and cause an aircraft to move in the opposite direction. Control surfaces are also referred to as flight control surfaces or flight controls. As used herein, an aircraft includes, without limitation, an airplane, a helicopter, a carrier, a commercial airliner, a sea plane, or any other type of aircraft.

Control surfaces are manipulated by pilots or by control laws to move an aircraft about its axes of motion and/or change an orientation of the aircraft. Control surfaces are frequently manipulated by using control devices such as a control yoke, a control stick, and/or pedals. Control surfaces may also be manipulated by control laws and/or logic in response to external gust or pilot commands input using a control device.

Control surfaces include, without limitation, ailerons, flaperons, rudders, spoilers, elevators, trim devices, and flaps. The ailerons, spoilers and flaperons are used to bank or roll an aircraft about the aircraft's longitudinal axis. The rudder yaws an aircraft about a vertical axis. The elevator moves an aircraft about the aircraft's lateral axis to change the aircraft's pitch attitude. Utilization of symmetric flaperons results in vertical motion of an aircraft.

For example, the pitch of an aircraft may be changed using elevators located on the horizontal tail of an aircraft. The pitch of an aircraft may cause the nose of the aircraft to go up or down. An elevator may be moved upwards, with trailing edge up, to cause the pitch of the aircraft to be upward.

The elevators may be moved downwards, with trailing edge down, to cause the pitch of the aircraft to be downward. An elevator decreases or increases the downward force caused by the tail. An increased downward force is produced by the elevator moving up, which forces the tail down and the nose up. When the elevator moves down, with trailing edge down, an upward force occurs on the tail when the elevator is moved down to force the tail up and move the nose down.

The changing of the position of the elevator may change the load that is placed on the tail of an aircraft. This load may be on the horizontal tail as well as structures within the tail of the aircraft. Currently, the speed of an aircraft has been used to limit the amount of load that may be generated by an elevator. The movement of the elevator may be limited based on the speed of the aircraft.

However, these traditional limits are not able to be set too strict to handle extreme maneuvers since strict limits would affect the maneuverability of the aircraft in other flying patterns. As a result, additional structures are needed to handle the load caused by these extreme maneuvers.

The different advantageous embodiments recognize that in designing an aircraft, structures in an aircraft are required to take into account peak structural loads during extreme maneuvers using control surfaces such as elevators. The different advantageous embodiments recognize that these structural requirements add to the weight of an aircraft.

Therefore, the different advantageous embodiments recognize that it would be desirable to have a method and apparatus to alleviate loads on control surfaces, such as a tail of an aircraft.

SUMMARY

In one advantageous embodiment, a method is present for controlling control surfaces. A position limit is identified for movement of a control surface based on a load limit set for the control surface and a number of vehicle current operation parameters to form an identified position limit. Responsive to receiving a command to move the control surface on a vehicle to a new position, the control surface is commanded to move to a position within the identified position limit.

In another advantageous embodiment, a vehicle comprises a control surface, an actuator system, a sensor system, and a computer. The actuator system is connected to the control surface. The sensor system is capable of generating a number of vehicle current operation parameters during operation of the vehicle. The computer is connected to the sensor system and the actuator system. The computer executes a load alleviation process by receiving the number of vehicle current operation parameters while the vehicle is in operation to identify a position limit for movement of the control surface based on a load limit set for the control surface and the number of vehicle current operation parameters to form an identified position limit and to move the control surface within the identified position limit in response to receiving a command to move the control surface to a new position.

In yet another advantageous embodiment, an aircraft comprises a body, a first wing for the body, a second wing for the body, a horizontal tail at one end of the body, an elevator system located on the horizontal tail, an actuator system located in the aircraft and connected to the elevator system, a sensor system, and a flight control computer. The sensor system is capable of generating a number of vehicle current operation parameters during operation of the aircraft. The flight control computer is connected to the sensor system and the actuator system. The flight control computer executes a load alleviation process to receive the number of vehicle current operation parameters while the aircraft is in operation, identifying a position limit for movement of the elevator system based on a load limit set for the elevator system, and the number of vehicle current operation parameters to form an identified position limit and to move the elevator system to a position within the identified position limit in response to receiving a command to move the elevator system on the horizontal tail to a new position.

In still another advantageous embodiment, a computer program product is present for controlling control surfaces. The computer program product comprises a computer recordable storage medium and program code. Program code is present for identifying a position limit for movement of a control surface based on a load limit set for the control surface and a number of vehicle current operation parameters to form an identified position limit. Program code also is present, responsive to receiving a command to move the control surface on a vehicle to a new position, for moving the control surface to a position within the identified position limit.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
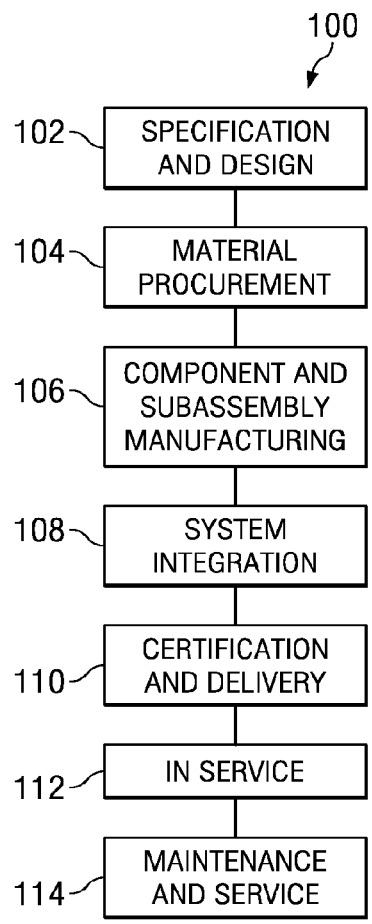
FIG. 1 is a diagram illustrating an aircraft manufacturing and service method in accordance with an advantageous embodiment.
Figure 2:
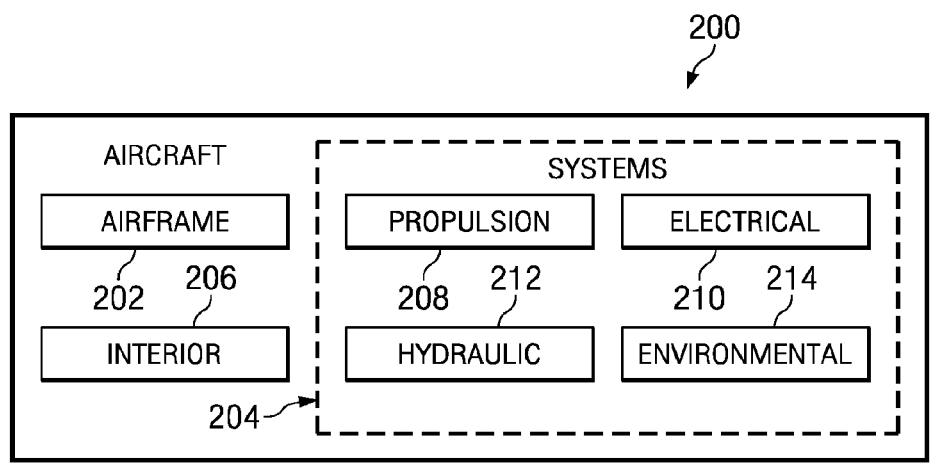
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, an advantageous embodiment may be implemented during component and subassembly manufacturing 106 to provide controls for control surfaces. In another advantageous embodiment, controls may be implemented during maintenance and service 114 to provide controls for control surfaces. This type of implementation may involve changing software and/or hardware components for a flight control computer.

The different advantageous embodiments recognize and take into account that currently used processes for controlling loads caused by control surfaces may be static. For example, current designs may provide limits to the positions or movements of control surfaces based on calculations made for peak loads on structures associated with those control surfaces. A structure associated with a control surface is a structure that may experience a load because of movement and/or a change in position of a control surface. These loads may be, for example, without limitation, loads caused by moments, shear, and/or other suitable types of loads.

Thus, the different advantageous embodiments recognize that the currently used designs require structures that may experience these loads to be sufficiently reinforced and/or designed to withstand any potential peak load that may occur during different types of maneuvers. The different advantageous embodiments recognize that these designs may require additional weight.

The different advantageous embodiments also recognize that some current designs do dynamically limit the position of a control surface. For example, currently available designs may control the maximum and minimum position of a control surface, such as an elevator, based on the speed of an aircraft. The different advantageous embodiments recognize, however, that these designs do not take into account different types of aircraft and the manner in which the loads may vary. As a result, the limits generated at a particular speed are the same for each type of aircraft.

Further, the different advantageous embodiments recognize that currently used designs do not take into account various altitudes, weights, centers of gravity, and/or flap settings. As a result, the advantageous embodiments recognize that the limits generated at a particular speed may be the same for all altitudes, all weights, all centers of gravity, and all flap settings.

The different advantageous embodiments recognize and take into account that the load may be dynamically identified during the operation of the aircraft. Thus, the limit to the position of an aircraft may be based on the desired load. Thus, if the desired load may be maintained within selected load limits, the design of the aircraft need only take into account those load limits.

In this manner, the weight and/or thickness of a control surface and/or the body of an aircraft may be reduced. The different advantageous embodiments recognize that this type of reduction is possible because the position of the control surface is limited during flight such that extreme maneuvers may more severely limit the position of a control surface as compared to typical maneuvers in which lower load forces are generated.

Thus, an advantageous embodiment provides a method, apparatus, and computer program product for controlling control surfaces. A position limit is identified for a control surface based on a load limit sent for the control surface and a number of vehicle current operation parameters to form and identify the position limit. The load limit is a load that may not be exceeded during one or more types of maneuvering of the aircraft, in these examples.

In response to receiving a command to move the control surface on the vehicle, the control surface is moved within the identified position limit. As used herein, "a number" when used with reference to an item refers to one or more items. For example, a number of vehicle current operation parameters are one or more vehicle current operation parameters. In these examples, vehicle current operation parameters are parameters currently being used to operate and/or present during operation of a particular vehicle. In other words, these vehicle current operation parameters may change depending on the type of vehicle.

In the different advantageous embodiments, the position limit for the control surface may be identified using a function. The function sets the load limit as a constant and has the number of vehicle current operation parameters as inputs to provide a limit for the position of the control surface.

The limit may be, for example, a range of positions for the control surface. In other advantageous embodiments, the limit may be an upper limit for the movement of the control surface and/or a lower limit. In other words, the different advantageous embodiments identify an allowable amount of travel for a control surface to prevent movement of the control surface from causing a load that exceeds the desired allowable load.

In this manner, the different advantageous embodiments may provide limits to the position for control surfaces in a dynamic fashion. The use of the term "dynamic" in these examples means that the particular process, step, and/or operation being performed are dynamically performed while the vehicle is in operation. This process may be performed continuously and/or in response to certain events and/or commands occurring during the operation of the vehicle.

Figure 3:
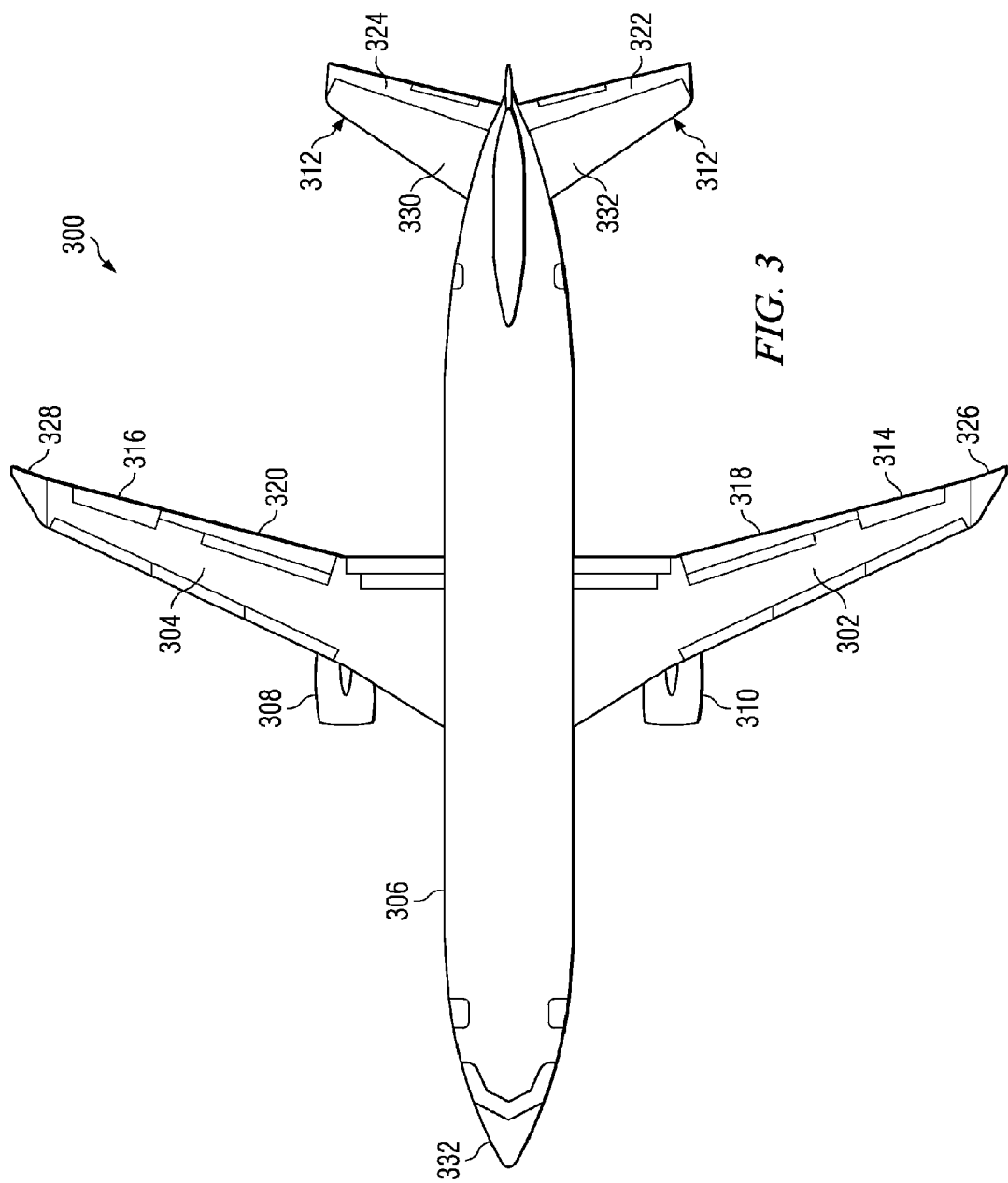
FIG. 3 is a diagram of an aircraft having control surfaces that may be controlled in accordance with an advantageous embodiment.

With reference now to FIG. 3, a diagram of an aircraft having control surfaces that may be controlled is depicted in accordance with an advantageous embodiment. Aircraft 300 is an example of an aircraft, such as aircraft 200 in FIG. 2. In this illustrative example, aircraft 300 has wings 302 and 304 attached to body 306. Aircraft 300 also includes wing-mounted engine 308, wing-mounted engine 310, and tail 312.

Aircraft 300 also has a number of control surfaces. These control surfaces include, for example, without limitation, left wing aileron 314, right wing aileron 316, left wing outboard and inboard spoilers 318, right wing outboard and inboard spoilers 320, left elevator 322, and right elevator 324.

Left wing aileron 314 and right wing aileron 316 are hinged control surfaces attached to trailing edge 326 of left wing 302 and trailing edge 328 of right wing 304, respectively. When one aileron goes up, the other aileron typically goes down to create a roll in aircraft 300. For example, left wing aileron 314 goes downward to increase the lift on left wing 302 while right wing aileron 316 moves upward to reduce the lift on right wing 304 to produce a roll about a longitudinal axis for aircraft 300.

Left wing outboard and inboard spoilers 318 and right wing outboard and inboard spoilers 320 are devices on a top surface of a wing that can be extended upward into the airflow to create a reduction in the lift of the section of the wing associated with the spoiler. An inboard spoiler is a spoiler located on a section of the wing that is near body 306 of aircraft 300. An outboard spoiler is a spoiler located in a section of a wing that is located away from body 306 of aircraft 300.

Elevators, such as left elevator 322 and right elevator 324, control the orientation of aircraft 300 by changing the pitch of aircraft 300. These elevators are located on tail 312. In addition, stabilizers 330 and 332 are also located on tail 312. Stabilizers 330 and 332 operate independent of elevators 322 and 324.

When the trailing edges of elevators 322 and 324 move up, nose 332 moves upward. When the trailing edges of elevators 322 and 324 move down, nose 332 moves downward. In these examples, left elevator 322 and right elevator 324 move in a symmetrical fashion such that both elevators move the same amount in the same direction. This type of movement changes the pitch of aircraft 300 upwards or downwards.

Aircraft 300 may include additional control surfaces not shown in FIG. 3. For example, aircraft 300 may also include at least one of a flaperon, a spoileron, an elevon, and/or a taileron. A flaperon is a control surface that combines an aileron and a flap. A spoileron is a spoiler used in conjunction with an aileron. An elevon is an aileron combined with an elevator. A taileron is a control surface on tail 312 of aircraft 300 that enables roll control.

One or more of these different control surfaces on aircraft 300 may be controlled using different advantageous embodiments to limit the movement or position of a control surface in a manner that maintains a load associated with the control surface within a desired limit or threshold. In the different advantageous embodiments, this type of control is performed dynamically during operation of aircraft 300.

As a result, the limit to the amount of movement of different control surfaces to different positions may vary as a number of vehicle current operation parameters change during operation of aircraft 300. For example, during more extreme maneuvers, such as a joint aviation regulations, a check maneuver, which involves pulling and then pushing; or an abrupt up maneuver, which involves a sudden full trailing edge up; the position of a control surface may be limited more than during a less extreme maneuver such as a gradual turn of an aircraft.

The illustration of aircraft 300 in FIG. 3 is not meant to imply physical or architectural limitations to the manner in which different advantageous embodiments may be implemented. For example, in some advantageous embodiments, aircraft 300 may include fewer control surfaces, additional different control surfaces, and/or one or more control surfaces as shown for aircraft 300 in FIG. 3 with modifications to the control surfaces.

As yet another example, in some advantageous embodiments, aircraft 300 may include additional engines other than wing-mounted engine 308 and wing-mounted engine 310. Although aircraft 300 is illustrated as a commercial aircraft, other advantageous embodiments may be applied to other types of aircraft such as, for example, a cargo aircraft and/or a military fighter aircraft.

Figure 4:
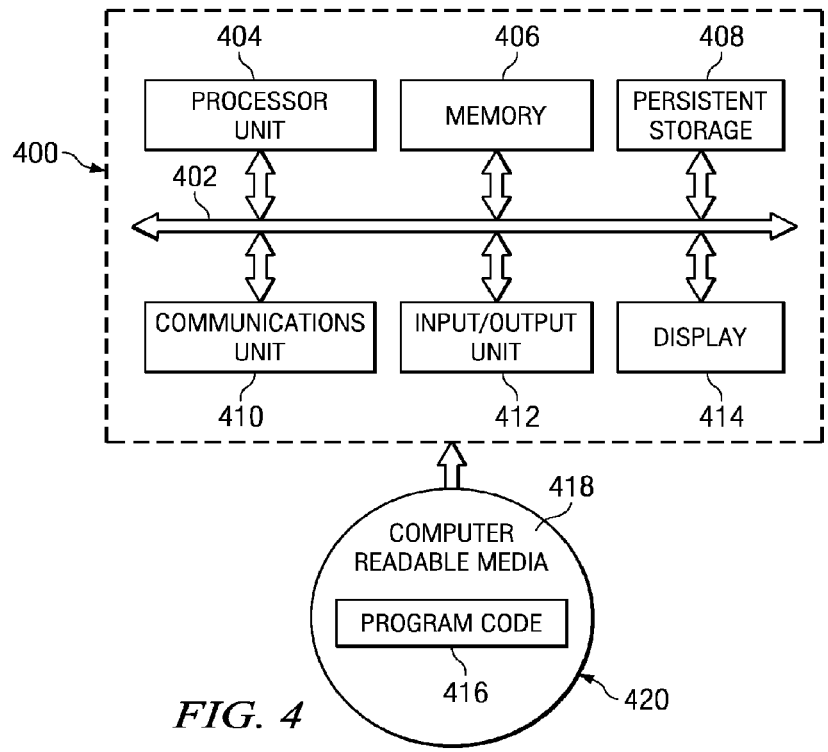
FIG. 4 is a diagram of a data processing system in accordance with an advantageous embodiment.

Turning now to FIG. 4, a diagram of a data processing system is depicted in accordance with an advantageous embodiment. Data processing system 400 is an example of hardware that may be implemented in a vehicle such as, for example, aircraft 200 in FIG. 2 or aircraft 300 in FIG. 3 to control the control surfaces. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices.

For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408.

In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
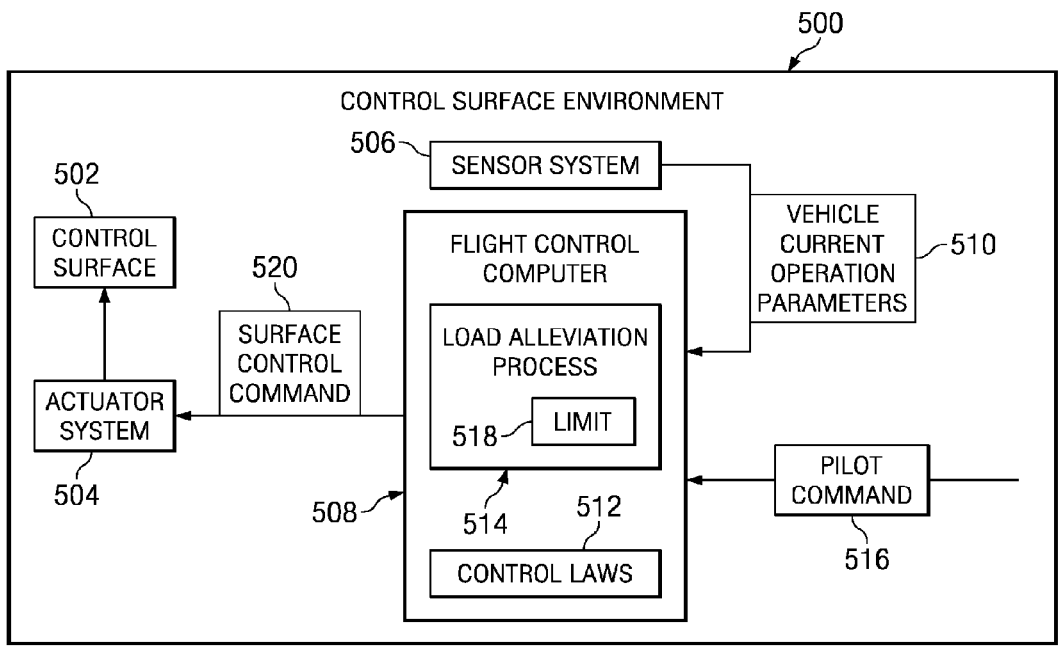
FIG. 5 is a block diagram of a control surface environment in accordance with an advantageous embodiment.

With reference now to FIG. 5, a block diagram of a control surface environment is depicted in accordance with an advantageous embodiment. In this illustrative example, control surface environment 500 is an example of components that may be found within a vehicle such as, for example, aircraft 300 in FIG. 3. In this example, control surface environment 500 includes control surface 502, actuator system 504, sensor system 506, and flight control computer 508.

Actuator system 504 contains a number of actuators that may be used to control the orientation of movement of a vehicle. Actuator system 504 may work in conjunction with various hydraulic, mechanical, and/or other biasing mechanisms to move control surface 502.

Control surface 502 is a control surface that may be controlled by actuator system 504. Control surface 502 may take various forms. For example, control surface 502 may be an elevator, a flap, an aileron, a spoiler, a flaperon, a spoileron, an elevon, a taileron, a rudder, or some other suitable control surfaces.

Sensor system 506 includes a number of sensors that may provide input to flight control computer 508. In these examples, the input may take the form of vehicle current operation parameters 510. These parameters may include, for example, without limitation, air and/or inertial data. This data may include, for example, a true airspeed, a normal acceleration, a pitch acceleration, a lateral acceleration, a body pitch rate, a body yaw rate, a body roll rate, a side slip angle, an angle of attack, a speed of sound, a dynamic pressure, a control surface position, which may be the stabilizer position, and/or other suitable parameters. Some of these parameters may be directly measured, while other parameters may be derived from measured parameters.

Flight control computer 508 determines the amount of movement that control surface 502 may make to a particular position. Flight control computer 508 may be implemented using a data processing system such as, for example, data processing system 400 in FIG. 4. Flight control computer 508 may be, for example, without limitation, a flight control module line replaceable unit.

Control laws 512 and load alleviation process 514 are examples of software components that may be implemented in flight control computer 508 to control the movement of control surface 502. Control laws 512 may be used to generate a command for actuator system 504 in response to pilot command 516.

In the different advantageous embodiments, load alleviation process 514 limits the commands generated by control laws 512. In other words, load alleviation process 514 may limit the movement of a command generated by control laws 512. This limit may include a maximum movement and/or position of control surface 502 and/or a minimum movement and/or position of control surface 502. For example, if control surface 502 takes the form of an elevator, the maximum limit may be the highest upward position of the elevator while the minimum is the lowest or downward position of the elevator.

Load alleviation process 514 generates limit 518 based on vehicle current operation parameters 510. As used herein, vehicle current operation parameters 510 are one or more parameters that affect the load caused by control surface 502. In these examples, load alleviation process 514 employs a function that describes the tail load. For example, the tail load may be described as a function of at least one of the following parameters: $\alpha$; q, Vt, Nz, qdot, Mach, qc, stabilizer position, elevator position, and other suitable parameters that contribute to load on a structure associated with control surface 502.

In these examples, $L_0$ is load due to a zero angle of attack for the aircraft body, Nz is normal acceleration relative to aircraft body axis, q is rate of body pitch, $\alpha$ is angle of attack for the aircraft body, Vt is true airspeed, qdot is pitch acceleration, Mach is speed of sound, and qc is dynamic pressure. The tail load may be computed from an equation such as the following equation:

$$L_{HT} = L_0 + L_{\alpha body} * \alpha + L_{stab} * (\text{stabilizer position}) + L_q * q * \text{chord}/2/V_t + L_{fz} * Nz + L_{my} * q\text{dot} + L_{elev} * (\text{elevator position}),$$

where $L_{HT}$ is the load of the horizontal tail, $L_{xx}$ represents the load tables as a function of Mach & qc, and chord represents the wing chord measured in feet.

This equation may be rearranged to be a function to identify the elevator position, such as:

$$\text{Elevator position} = (L_{HT} - (L_0 + L_{\alpha body} * \alpha + L_{stab} * (\text{stabilizer position}) + L_q * q * \text{chord}/2/V_t + L_{fz} * Nz + L_{my} * q\text{dot}))/L_{elev}.$$

With this type of rearrangement, the positive and negative loads, $L_{HT}$, are defined as fixed values, while the other parameters are based on vehicle current operation parameters 510.

In this manner, the maximum and/or minimum position of control surface 502 may be identified. The maximum and/or minimum positions of control surface 502 forms limit 518. This limit on the position of the control surface may be applied to the movement of the control surface to a position generated by control laws 512. The application of this limit results in limiting the surface control command 520 being sent to actuator system 504 to move control surface 502 to a particular position.

For example, the operation of the vehicle may be such that vehicle current operation parameters 510 allow for the maximum possible movement of control surface 502. In other operating conditions such as, for example, an extreme maneuver, vehicle current operation parameters 510 may be such that the amount of movement for control surface 502 may be limited to some amount less than the maximum amount of movement possible.

In other words, the maximum upward position for control surface 502 in the form of an elevator may be less than what is mechanically possible based on the limit generated by load alleviation process 514. In another example, the minimum may be the lower or downward position of the elevator, which also may be less than the lowest possible position for the elevator.

In these examples, load alleviation process 514 continually generates limits based on vehicle current operation parameters 510. These limits vary as vehicle current operation parameters 510 vary. As a result, load alleviation process 514 dynamically creates a limit that changes while the vehicle conditions change. In other advantageous embodiments, load alleviation process 514 may generate a limit at all times and may have a large limit when there are no maneuvers by the pilot.

Figure 6:
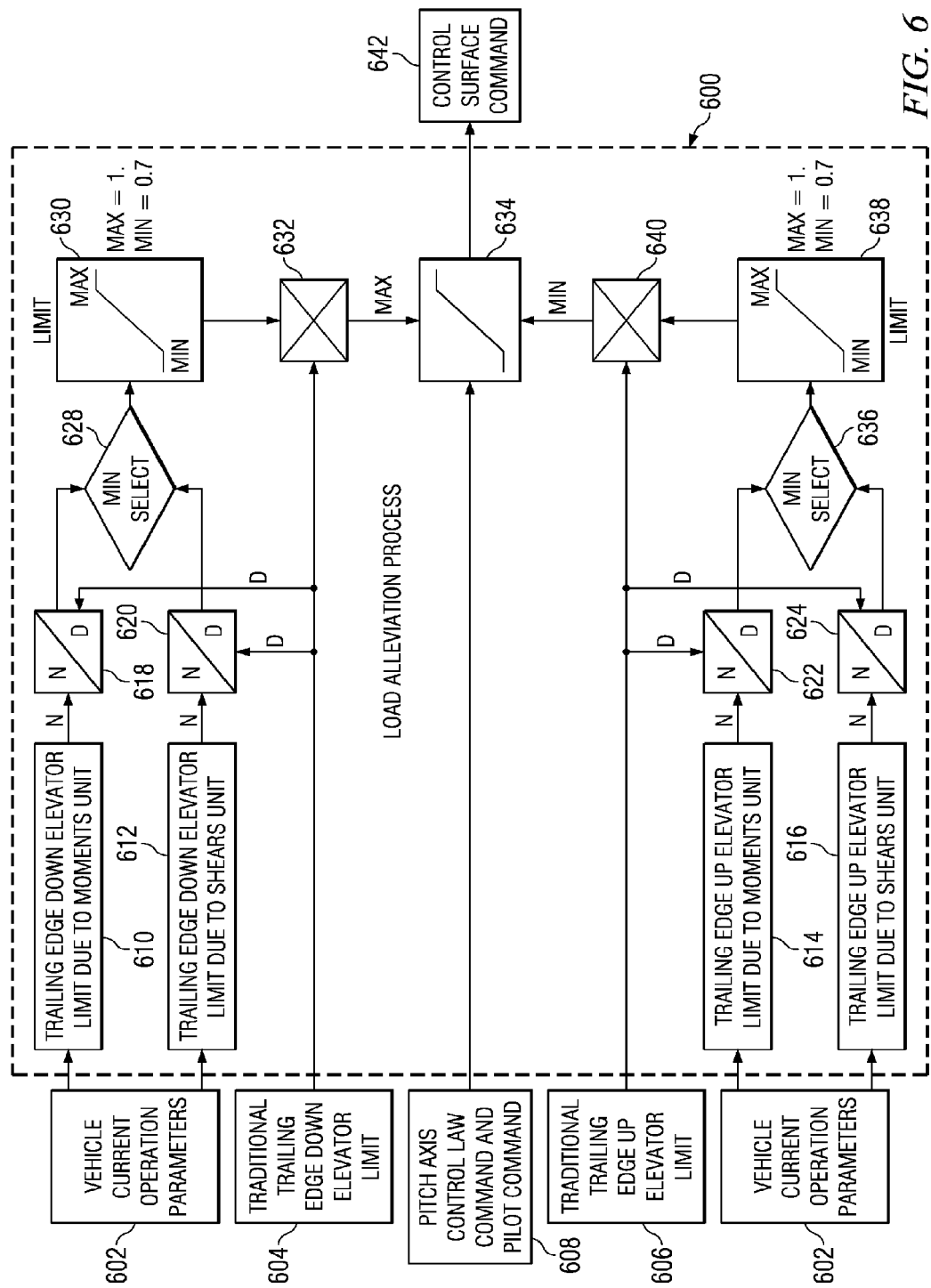
FIG. 6 is a diagram illustrating a load alleviation process in accordance with an advantageous embodiment.

With reference now to FIG. 6, a diagram illustrating a load alleviation process is depicted in accordance with an advantageous embodiment. Load alleviation process 600 is a more detailed illustration of load alleviation process 514 in FIG. 5. In this example, load alleviation process 600 is used to alleviate horizontal tail loads.

Load alleviation process 600 may limit the position of a control surface. This control surface may take the form of an elevator, such as left elevator 322 or right elevator 324 in FIG. 3.

In these examples, vehicle current operation parameters 602 are inputs into load alleviation process 600. Other inputs into load alleviation process 600 include traditional trailing edge down elevator limit 604, traditional trailing edge up elevator limit 606, and pitch axis control law command and pilot command 608. Trailing edge down elevator limit 604 and trailing edge up elevator limit 606 are examples of traditional limits. In these illustrative examples, a traditional limit is a limit that does not take into account a load limit and vehicle current operation parameters, such as vehicle current operation parameters 602. Vehicle current operation parameters 602 may be, for example, vehicle current operation parameters 510 in FIG. 5.

Traditional trailing edge down elevator limit 604 and traditional trailing edge up elevator limit 606 are limits to the position of the elevator based on currently used processes. Traditional trailing edge down elevator limit 604 limits the downward position of an elevator, while traditional trailing edge up elevator limit 606 limits the upper position of an elevator.

For example, these two limits may be set based on the speed of the aircraft. These limits are currently implemented in a manner in which the speed sets the limit regardless of the altitudes, center of gravity, weights, or other parameters of the aircraft. As a result, these limits do not take into account load factors on a particular structure associated with a control surface. For example, these limits do not take into account the load on the tail based on movements of the elevator.

Pitch axis control law command and pilot command 608 are commands that may be generated by the control laws in the flight computer. A pitch axis control law processes the pilot command based on the airplane response and then generates the command to satisfy the pilot's desire based on certain criteria.

Load alleviation process 600 includes trailing edge down elevator limit due to moments unit 610, trailing edge down elevator limit due to shears unit 612, trailing edge up elevator limit due to moments unit 614, and trailing edge up elevator limit due to shears unit 616. These different units are software components that can be used to generate positional limits for the elevator for an upward position and a downward position when the control surface takes the form of an elevator. In other advantageous embodiments, a minimum limit may be a retracted position in a particular wing or structure in which the control surface is located rather than a downward position.

Trailing edge down elevator limit due to moments unit 610 and trailing edge up elevator limit due to moments unit 614 generate positional limits for an elevator based on loads caused by moments in the tail. Trailing edge down elevator limit due to shears unit 612 and trailing edge up elevator limit due to shears unit 616 generate positional limits for the elevator based on shear loads that may be applied to the tail. Of course, other types of loading may be taken into account with other units similar to these depending on the particular implementation.

A traditional limit is a limit generated by currently available systems which do not take into account vehicle current operation parameters that affect a load generated by a control surface. For example, a traditional limit may be based only on speed of the aircraft.

These different outputs are sent to dividers 618, 620, 622, and 624. Divider 618 divides the output of trailing edge down elevator limit due to moments unit 610 by traditional trailing edge down elevator limit 604. Divider 620 divides the output of trailing edge down elevator limit due to shears unit 612 by traditional trailing edge down elevator limit 604.

Divider 622 divides the output of trailing edge up elevator limit due to moments unit 614 by traditional trailing edge up elevator limit 606. Divider 624 divides trailing edge up elevator limit due to shears unit 616 by traditional trailing edge up elevator limit 606. The output of these dividers may be referred to as initial position limits.

A minimum value of divider 618 and 620 is selected by min select unit 628. This value is sent to limit unit 630. Limit unit 630 may provide an upper and lower limit to the value selected by min select unit 628. In other words, limit unit 630 generates a limited first position limit and a limited second position limit for the control surface.

In this example, the upper value may be a maximum of around one, while the lower value may be a minimum of around 0.7. The upper value of one is set to ensure that the upper movement is not greater than the traditional limit in traditional trailing edge down elevator limit 604 in this example.

The minimum value may be set as a safeguard limit to ensure that the pilot has enough space to move the elevators in the case of equipment failure or malfunctions. A minimum number is chosen such that the minimum number is small enough to keep the tail load within the desired value, but large enough for the pilot to fly the aircraft in the case of failure or malfunction, which could clamp the limit to zero. In other words, the minimum value is set so that the minimum amount of movement of the control surface is restricted to a selected value, which in this example, is the minimum number that is chosen.

The output of limit unit 630 is multiplied by traditional trailing edge down elevator limit 604 in multiplier 632. As a result, the maximum downward movement for the elevator may not be any more than the traditional trailing edge down elevator limit 604 in these examples. In other words, the maximum amount of movement of the elevator is restricted to an amount that is less than the traditional limit for movement. This output is sent to limit unit 634 as a maximum limit. In this example, the maximum limit is the maximum movement or position of the trailing edge of the elevator in a downward direction.

The output of dividers 622 and 624 are sent to min select unit 636, which selects the minimum value of these two outputs. This output is sent to limit unit 638, which limits the value output from min select unit 636 to a value between one and 0.7. The output of limit unit 638 is multiplied with traditional trailing edge up elevator limit 606 at multiplier 640. The output is sent to limit unit 634 as a minimum position for the trailing edge of the elevator. In this example, the minimum position is the farthest position upward that the trailing edge of the elevator may move. Again, the maximum amount of movement of the elevator is restricted to an amount that is less than the traditional limit for movement.

Control surface command 642 is limited by the maximum and minimum values of limit unit 634 set using load alleviation process 600 in accordance with an advantageous embodiment. In other words, pitch axis control law command and pilot command 608 is an example of a command that may have an identified position limit applied to the command. The application of the command forms an applied limited command, such as control surface command 642. The applied limited command may not be altered from the original command if the original command falls within the limit or limits generated when applying a limit to the command. If the original command exceeds the limits, the command is then altered to form the applied limited command. Further, the limit applied to the command is selected from the most restricted limit of the traditional position limit and identified position limit.

Figure 7:
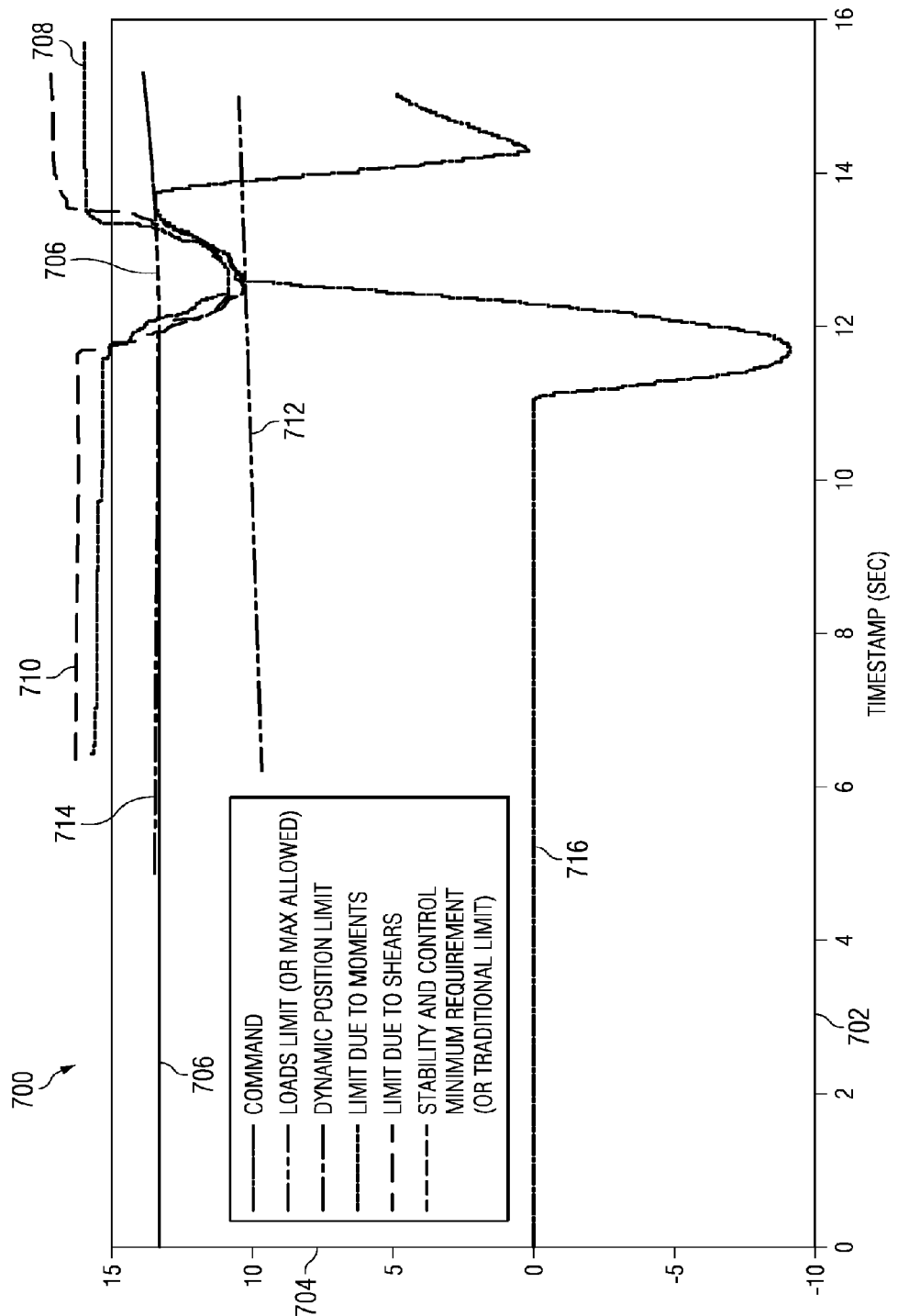
FIG. 7 is a graph of trailing edge up elevator limits generated by a load alleviation process in accordance with an advantageous embodiment.

With reference now to FIG. 7, a graph of trailing edge down elevator limits generated by a load alleviation process is depicted in accordance with an advantageous embodiment. Graph 700 presents an example of limits that may be generated using a load alleviation process, such as load alleviation process 600 in FIG. 6.

In this illustrative example, horizontal axis 702 represents time and vertical axis 704 represents the position of a control surface in degrees. The control surface is an elevator in these examples. In other advantageous embodiments, vertical axis 704 may represent the position of a control surface in inches, feet, or some other unit.

Line 706 represents the Stability and Control minimum requirement, or the traditional limit, which is one example of traditional trailing edge down elevator limit 604 in FIG. 6. Line 708 represents the limit due to moments, which is one example of trailing edge down elevator limit due to moments unit 610 in FIG. 6. Line 710 represents the limit due to shears, which is one example of trailing edge down elevator limit due to shears unit 612. Line 712 represents the loads limit, or maximum allowed limit, given a worst-case scenario.

In these examples, the maximum allowed limit is determined by the maximum allowed downwards movement of the elevators based on the load of the structures and speed for the worst-case scenario. In graph 700, the maximum allowed limit is approximately 10 degrees, meaning that the maneuver of the elevator cannot exceed around 10 degrees downward movement. Line 712 represents the loads limit as calculated by current implementations and does not account for real-time values or scenarios.

Line 714 represents a dynamic position limit, which is one example of the position limit values of limit unit 634 in FIG. 6. The dynamic position limit represents the limit as generated by the advantageous embodiment by load alleviation process 600 in FIG. 6.

As can be seen in graph 700, when the limit due to moments, line 708, and the limit due to shears, line 710, are greater than the traditional limit, line 706, the dynamic position limit, line 714, follows the traditional limit. However, when the limit due to shears and/or the limit due to moments are less than the traditional limit, the dynamic position limit follows the limit that is the lowest, and in this case, the dynamic position limit follows the limit due to shears. The dynamic position limit follows the limit due to shears until both the limit due to shears and the limit due to moments are again greater than the traditional limit, at which point the dynamic position limit resumes following the traditional limit.

Line 716 represents a command for maneuvering the elevator. This command is one example of control surface command 642 in FIG. 6. As can be seen in this illustrative example, when the command is generated to maneuver the elevator, the command is limited by the dynamic position limit generated by load alleviation process 600 in FIG. 6. The command for maneuvering the elevator can only allow for downward movement up to the dynamic position limit. In this way, load alleviation process 600 in FIG. 6 limits a command, such as control surface command 642 in FIG. 6, as seen by the dynamic position limit, line 714, and the command, line 716.

Figure 8:
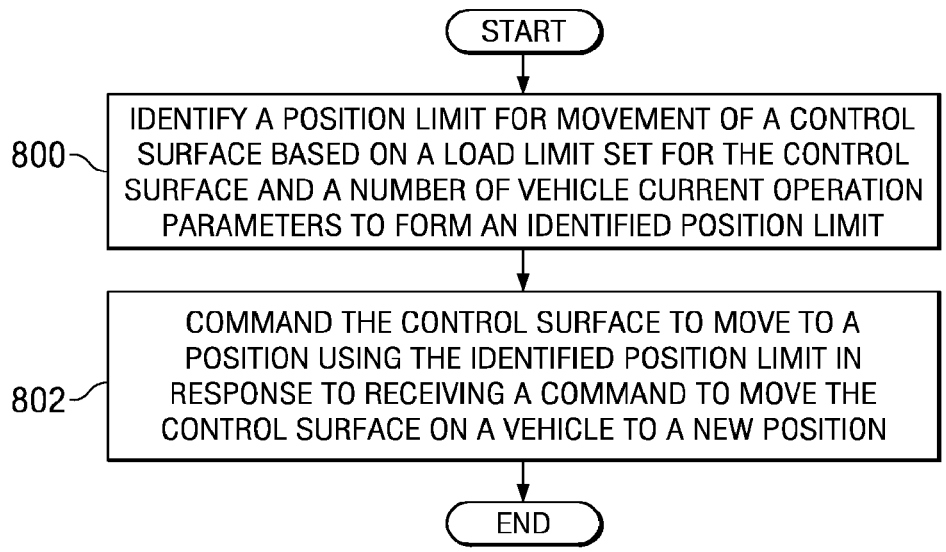
FIG. 8 is a high-level flowchart of a process for controlling movements of a control surface in accordance with an advantageous embodiment.

With reference now to FIG. 8, a flowchart of a high-level process for controlling movements of a control surface is depicted in accordance with an advantageous embodiment. The process illustrated in FIG. 8 is an example of a process that may be implemented in flight control computer 508 in FIG. 5. In particular, this process may be implemented in load alleviation process 514 in FIG. 5.

The process begins by identifying a position limit for movement of a control surface based on a load limit set for the control surface and a number of vehicle current operation parameters to form an identified position limit (operation 800). Operation 800 may be performed solely by generating a limit for the movement based on the load limit in the vehicle current operation parameters.

In other advantageous embodiments, this operation may include taking into account a more traditional limit such as a speed base limit. With this type of implementation, the position limit may be one that cannot be greater than the speed base limit, but may be lower depending on the vehicle current operation parameters.

The process then commands the control surface to move to a position using the identified position limit in response to receiving a command to move the control surface on a vehicle to a new position (operation 802), with the process terminating thereafter. In operation 802, commanding the control surface to move to the position may involve generating and sending a command and/or signal to an actuator system to move the control surface to the new position.

Figure 9:
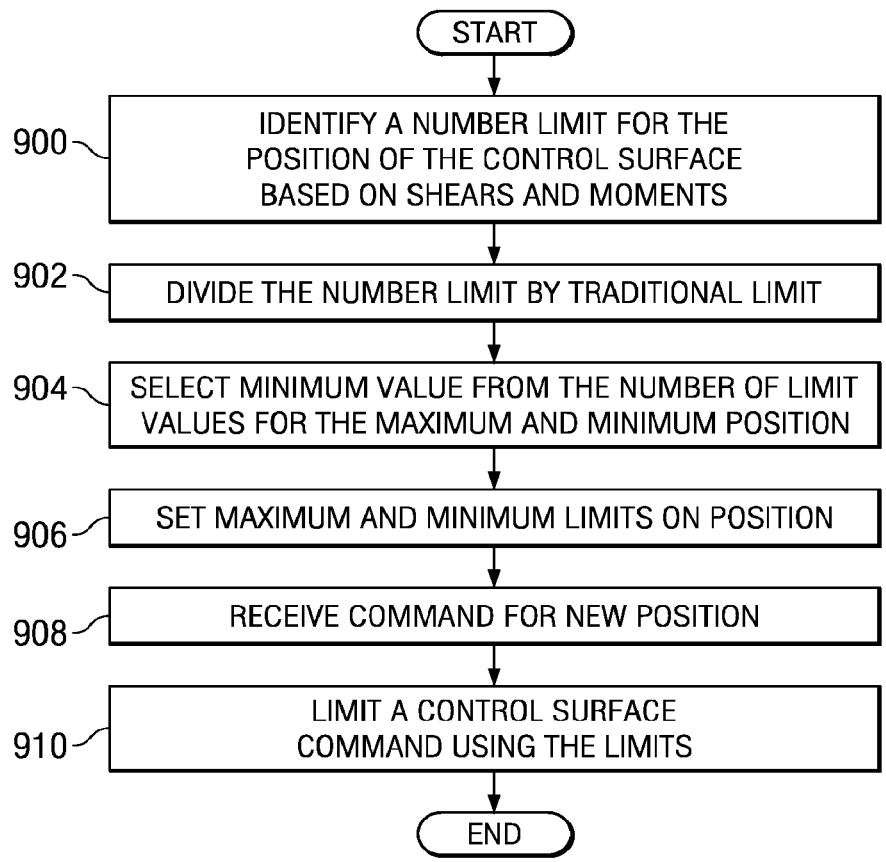
FIG. 9 is a flowchart of a process for identifying position limits based on predetermined loads in accordance with an advantageous embodiment.

With reference now to FIG. 9, a flowchart of a process for identifying load limits is depicted in accordance with an advantageous embodiment. The process illustrated in FIG. 9 is a more detailed example of one implementation for operation 800 in FIG. 8.

The process begins by identifying a number limit for the position of the control surface based on shears and moments (operation 900). These limits may be, for example, those generated by trailing edge down elevator limit due to moments unit 610, trailing edge down elevator limit due to shears unit 612, trailing edge up elevator limit due to moments unit 614, and trailing edge up elevator limit due to shears unit 616 in FIG. 6.

The process then divides the number limit by a traditional limit (operation 902). This traditional limit may be, for example, a fixed limit or a speed based limit depending on the particular implementation. Operation 902 results in a number of limit values. In this example, the number of limit values is a minimum limit and a maximum limit. In other advantageous embodiments, only a maximum limit value may be generated depending on the type of control surface.

The process then selects the minimum or lowest minimum value from the number of limit values for the maximum and minimum position of the control surface (operation 904). Operation 904 results in two values being selected in these examples. The process then sets the maximum and minimum limits on the position of the control surface based on the minimum value selected for the maximum and minimum positions of the control surface (operation 906).

The process receives a command for a new position for the control surface (operation 908). This command may be one generated by a control law in response to a pilot command. The process then limits a control surface command using the limits (operation 910) with the process terminating thereafter. In operation 910, the received command for a new position may be limited based on the limits generated for the control surface.

The process illustrated in FIG. 9 is presented for purposes of illustrating one manner in which different advantageous embodiments may be implemented. The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. For example, in some advantageous embodiments, the limits generated in the process in FIG. 9 may not be limited based on traditional limits or currently used limits. In other advantageous embodiments, only an upper limit or lower limit may be generated depending on the particular implementation.

Thus, the different advantageous embodiments provide a method, apparatus, and computer usable program code for alleviating loads on structures. In these illustrative examples, horizontal tail load alleviation is illustrated. In the different advantageous embodiments, the load on the tail of an aircraft may be alleviated by limiting the movement of a control surface such as an elevator.

In the different advantageous embodiments, the limits are generated using a function in which the load is set or fixed. The other parameters include vehicle current operation parameters that are used to calculate the load on the particular structure. The result is a maximum or minimum position for the control surface.

In this manner, the different advantageous embodiments make it possible to design structures with reduced weight. For example, less structural requirements may be present if the loads to the structure may be limited to a particular load limit. The different advantageous embodiments dynamically and/or continuously identify the limits on positions for control surfaces based on current operating parameters of the aircraft. In this manner, load limits for a particular structure associated with a control surface may not be exceeded.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Although the different advantageous embodiments in the illustrative examples are described with respect to an aircraft, one or more of the different advantageous embodiments may be applied to other vehicles other than aircraft, such as, for example, without limitation, a submarine, a missile, a personnel carrier, a tank, a train, an automobile, a bus, a spacecraft, a surface ship, and other suitable vehicles.

Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vehicle comprising:
a control surface;
an actuator system connected to the control surface;
a sensor system capable of generating a number of vehicle current operation parameters during operation of the vehicle; and
a computer connected to the sensor system and the actuator system, the computer configured to execute a load alleviation process configured to: receive a number of vehicle current operation parameters while the vehicle is in operation; identify a position limit for movement of the control surface based on: a traditional limit, a load limit set for the control surface due to moments and shears, and the number of vehicle current operation parameters, to form an identified position limit; and command the actuator system to move the control surface within the identified position limit in response to receiving a command to move the control surface to a new position.

2. The vehicle of claim 1, wherein the vehicle is selected from one of an aircraft, a missile, a submarine, a car, and a spacecraft.

3. An aircraft comprising:
a body;
a first wing for the body;
a second wing for the body;
a horizontal tail at one end of the body;
an elevator system located on the horizontal tail;
an actuator system located in the aircraft and connected to the elevator system;
a sensor system capable of generating a number of vehicle current operation parameters during operation of the aircraft; and
a flight control computer connected to the sensor system and the actuator system, the flight control computer configured to execute a load alleviation process configured to: receive the number of vehicle current operation parameters while the aircraft is in operation; identify a position limit for movement of the elevator system based on: a load limit due to shears and moments set for the elevator system, and the number of vehicle current operation parameters, to form an identified position limit; and command the actuator system to move the elevator system to a position within the identified position limit in response to receiving a command to move the elevator system on the horizontal tail to a new position.

4. A computer program product for controlling control surfaces, the computer program product comprising:
a computer recordable storage medium;
program code, stored on the computer recordable storage medium, configured to identify a position limit for movement of a control surface based on: a load limit set for the control surface due to moments and shears, and a number of vehicle current operation parameters, to form an identified position limit; and
program code, stored on the computer recordable storage medium, configured to command, responsive to receiving a command to move the control surface on a vehicle to a new position, the control surface to move to a position within the identified position limit.

5. The computer program product of claim 4, wherein the program code, stored on the computer recordable storage medium, for identifying the position limit for the movement of the control surface based on the load limit set for the control surface and the number of vehicle current operation parameters to form the identified position limit comprises:
program code, stored on the computer recordable storage medium, for identifying the position limit for the control surface using a function, wherein the function has the load limit as a constant and the number of vehicle current operation parameters as inputs to provide a limit for the position for the control surface to form the identified position limit.

6. The computer program product of claim 4, wherein the program code, stored on the computer recordable storage medium, for identifying the position limit for the movement of the control surface based on the load limit set for the control surface and the number of vehicle current operation parameters to form the identified position limit comprises:
program code, stored on the computer recordable storage medium, for computing a current position limit to the control surface based on the load limit set for the control surface and the number of vehicle current operation parameters to form an identified current position limit; and
program code, stored on the computer recordable storage medium, for multiplying the current position limit with a speed based limit for the control surface to form the identified position limit.

7. The computer program product of claim 6, wherein the current position limit to the control surface is selected from one of a maximum position limit and a minimum position limit.

8. The vehicle of claim 1, wherein the command to move the control surface is also based on a pitch axis control law command.

9. The vehicle of claim 1, wherein the current operation parameters comprise at least one of: a true airspeed, a normal acceleration, a pitch acceleration, a lateral acceleration, a body pitch rate, a body yaw rate, a body roll rate, a slide slip angle, an angle of attack, a speed of sound, a dynamic pressure, and a control surface position.

10. The aircraft of claim 3, wherein the identified position limit for movement of the elevator system is also based on a traditional trailing edge elevator limit.

11. The aircraft of claim 3, wherein the identified position limit for movement of the elevator system is also based on a pitch axis control law command.

12. The aircraft of claim 3, wherein the current operation parameters comprise at least one of: a true airspeed, a normal acceleration, a pitch acceleration, a lateral acceleration, a body pitch rate, a body yaw rate, a body roll rate, a slide slip angle, an angle of attack, a speed of sound, a dynamic pressure, and a control surface position.

13. The aircraft of claim 3, wherein the identified position limit is based upon a function describing a horizontal tail load.

14. The aircraft of claim 13, wherein the function is based upon at least one of: an aircraft body angle of attack, a rate of body pitch, a true airspeed, a normal acceleration, a pitch acceleration, an speed of sound value for the aircraft, a dynamic pressure value for the aircraft, an elevator position, and an aircraft stabilizer position.

15. The computer program product of claim 4, wherein the control surface is selected from one of: an elevator, a flap, a slat, an aileron, a rudder, an air brake, a trim device, and a flaperon.

16. The computer program product of claim 4, wherein the identified position limit is based upon a function describing a horizontal tail load.

17. The computer program product of claim 16, wherein the function is based upon at least one of: an aircraft body angle of attack, a rate of body pitch, a true airspeed, a normal acceleration, a pitch acceleration, an speed of sound value for the aircraft, a dynamic pressure value for the aircraft, an elevator position, and an aircraft stabilizer position.

* * * * *